United States Patent
Deurloo et al.

(10) Patent No.: US 9,328,819 B2
(45) Date of Patent: *May 3, 2016

(54) METHOD AND SYSTEM FOR PROVIDING A VOTING STRATEGY FOR DETERMINING A MODE STATE IN A SHIFT-BY-WIRE TRANSMISSION

(71) Applicant: Ford Global Technologies, LLC, Dearborn, MI (US)

(72) Inventors: Brian J. Deurloo, Howell, MI (US); Mark Edward Zyskowski, Dearborn, MI (US); Christopher Lee Danks, Northville, MI (US); Richard Reynolds Hathaway, Livonia, MI (US); Jeffrey James Tumavitch, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 121 days.

This patent is subject to a terminal disclaimer.

(21) Appl. No.: 14/157,934

(22) Filed: Jan. 17, 2014

(65) Prior Publication Data

US 2014/0136060 A1    May 15, 2014

Related U.S. Application Data

(63) Continuation-in-part of application No. 13/316,117, filed on Dec. 9, 2011, now Pat. No. 8,634,995.

(51) Int. Cl.
*F16H 61/02* (2006.01)
*F16H 61/00* (2006.01)

(52) U.S. Cl.
CPC .... *F16H 61/0204* (2013.01); *F16H 2061/0053* (2013.01); *F16H 2300/18* (2013.01); *F16H 2312/20* (2013.01)

(58) Field of Classification Search
None
See application file for complete search history.

(56) References Cited

U.S. PATENT DOCUMENTS

| | | | |
|---|---|---|---|
| 3,937,105 A | | 2/1976 | Arai et al. |
| 4,262,335 A | * | 4/1981 | Ahlen et al. ................. 701/51 |
| 4,892,014 A | | 1/1990 | Morell et al. |
| 5,436,837 A | * | 7/1995 | Gerstung et al. ............ 701/29.2 |
| 6,056,669 A | | 5/2000 | Marshall |
| 6,139,468 A | | 10/2000 | Goates et al. |
| 6,345,224 B1 | | 2/2002 | Schumacher et al. |
| 7,156,218 B2 | | 1/2007 | Yamamoto |
| 7,216,025 B2 | | 5/2007 | Keyse et al. |
| 7,349,770 B2 | | 3/2008 | Matsuzaki et al. |
| 8,634,995 B2 | * | 1/2014 | Deurloo et al. ................. 701/51 |
| 2003/0151490 A1 | * | 8/2003 | Gross et al. .................. 340/3.1 |
| 2006/0081085 A1 | * | 4/2006 | Otsuka et al. ............. 74/473.21 |
| 2009/0111647 A1 | | 4/2009 | Hecht et al. |
| 2009/0111648 A1 | | 4/2009 | Hecht et al. |
| 2009/0111649 A1 | | 4/2009 | Hecht et al. |
| 2009/0111654 A1 | | 4/2009 | Hecht et al. |
| 2009/0287383 A1 | | 11/2009 | Fujii et al. |

* cited by examiner

*Primary Examiner* — Edwin A Young
(74) *Attorney, Agent, or Firm* — Diederiks & Whitelaw, PLC (57) ABSTRACT

A voting strategy is used to determine the mode state of a transmission when a vehicle is restarted. The transmission includes a return to park feature and a controller including at least three memories. The controller is configured to write a remembered mode state into each memory. The remembered mode state is one of a Normal mode state that allows the transmission to automatically shift to Park, a hold mode state that causes the transmission to remain in Neutral and not automatically shift to Park upon detecting a triggering event or other mode states. The controller reads each memory and, when at least two of the remembered mode states are the same mode state, causes the transmission to enter a mode state corresponding to the same mode state.

26 Claims, 6 Drawing Sheets

METHOD AND SYSTEM FOR PROVIDING A VOTING STRATEGY FOR DETERMINING A MODE STATE IN A SHIFT-BY-WIRE TRANSMISSION

CROSS-REFERENCE TO RELATED APPLICATIONS

This application is a continuation-in-part of U.S. patent application Ser. No. 13/316,117, filed on Dec. 9, 2011, which application is hereby fully incorporated by reference in its entirety.

BACKGROUND OF THE INVENTION

1. Field of Invention

The present invention pertains to the field of automatic transmissions for motor vehicles and, more particularly, to a method and system for providing a voting strategy for determining, during vehicle start up, a mode state that the transmission was in when the vehicle was turned off.

2. Background of the Invention

A traditional automatic transmission includes a transmission control device employed to control the transmission of a motor vehicle. The transmission control device is used to select several ranges, such as: Park, wherein the transmission is locked to prevent the vehicle from moving; Neutral, wherein the transmission allows the vehicle to be moved freely, such as when being towed; Reverse, wherein the transmission allows the vehicle to move backwards; and one or more Drive ranges that enable forward motion of the vehicle. Usually, the transmission control device is in the form of a lever linked with a mechanical connection, such as a cable or a hydraulic line, to the transmission. Typically, the lever is also connected to an indicator. As the transmission control mechanism is moved from one range to another, the mechanical connection physically shifts the transmission to the selected range and the indicator moves to show the driver which range has been selected. Even if the vehicle is turned off, the driver is able to determine the current transmission range from the indicator and, in some cases, move the transmission control mechanism to Neutral if, for example, the vehicle is to be towed.

The traditional automatic transmission utilizes multiple friction elements for automatic gear ratio shifting. Broadly speaking, these friction elements may be described as torque establishing elements, although they are more commonly referred to as clutches or brakes. The friction elements function to establish power flow paths from an internal combustion engine to a set of vehicle traction wheels. During acceleration of the vehicle, the overall speed ratio, which is the ratio of a transmission input shaft speed to a transmission output shaft speed, is reduced during a ratio upshift as vehicle speed increases for a given engine throttle range. A downshift to achieve a higher speed ratio occurs as an engine throttle range increases for any given vehicle speed, or when the vehicle speed decreases as the engine throttle range is decreased. Various planetary gear configurations are found in modern automatic transmissions. However, the basic principle of shift kinematics remains similar. Shifting an automatic transmission having multiple planetary gearsets is accompanied by applying and/or releasing friction elements to change speed and torque relationships by altering the torque path through the planetary gearsets. Friction elements are usually actuated either hydraulically or mechanically based on the position of the transmission control device.

In a shift-by-wire transmission arrangement, the mechanical connection between the transmission control device and the transmission is eliminated. Instead, the transmission control device transmits an electrical signal along a wire to an electronic controller, which directs separate actuators to apply or release the various friction elements to obtain a desired gear ratio. The control device is no longer necessarily in the form of a lever because the control device is no longer moving a mechanical connection for controlling the transmission. Instead, the control device is typically an electro-mechanical interface (e.g., a series of buttons, a lever or a knob) that is used to instruct the transmission to switch between the transmission ranges. An electronic display, powered by a battery on the vehicle, is typically employed to indicate the current range for the transmission. Obviously, the electronic display must be on, and thus drawing power, in order for the driver to know which range has been selected.

Many vehicles with a shift-by-wire transmission incorporate a "Return to Park" feature to automatically shift the transmission into Park. See, for example, U.S. Pat. Nos. 3,937,105, 4,892,014 and 7,156,218, all of which are incorporated herein by reference. Such a feature is activated when certain triggering events occur, for example, when the system detects a seat belt being unbuckled while a driver door is opened and the vehicle is nearly stopped, or when the ignition is turned off. Automatically shifting the transmission into Park prevents unwanted motion of the vehicle.

While such a feature is helpful under most driving conditions, the feature is not helpful when the driver would like to exit the vehicle and have the vehicle remain in Neutral. For instance, many car-washing facilities are designed to pull a vehicle through a car wash machine with a conveyor. The driver simply drives the vehicle up to the conveyer, leaves the transmission in neutral and then exits the vehicle. The vehicle is then washed as the vehicle is either pushed or pulled through the car washing machine. However, if the vehicle automatically shifts to Park as soon as the driver exits the vehicle, both the vehicle and the conveyor may suffer damage.

Based on the above, there has been proposed a system for providing a Neutral Hold mode for a shift-by-wire transmission that is placed in various shift ranges, such as Park, Drive, and Neutral, and has an automatic Return to Park feature for shifting the transmission to Park when the vehicle is traveling at an extremely low speed or in a stopped condition as a driver prepares to exit the vehicle. The system includes a transmission control mechanism for determining which of the transmission ranges or modes is desired by the driver. A controller is used to receive information from various sensors, such as a door opening sensor, a seat belt sensor, an ignition switch sensor and the transmission control mechanism, to determine then to shift the transmission into the various ranges and modes. The Neutral Hold mode keeps the transmission from automatically shifting to Park for relatively short periods of time in order to allow the vehicle to be moved, such as when on a conveyor of a car washing machine.

Preferably, there are several methods of entering the Neutral Hold mode. The controller is configured to maintain the transmission in Neutral and not shift the transmission to Park upon detecting that a driver has exited the vehicle and a message is displayed when the system has entered the Neutral Hold mode. The controller is configured to cease displaying the message upon detecting that a battery is providing power below a threshold level and the controller is configured to maintain the Neutral Hold mode when the battery ceases to provide power. The system will leave the Neutral Hold mode when the transmission control mechanism is used to select a range other than Neutral.

In many vehicles, mainly because of regulatory requirements, the electronic display must be on when the transmission is in any gear setting other than Park. Therefore, if the driver puts the transmission in Neutral in order to tow the vehicle, the electronic display will remain on and eventually drain the battery as the vehicle is being towed for long distances, for example when the vehicle is being towed behind a recreational vehicle on a cross country trip. There has been proposed a system for providing a Neutral Tow mode for a shift-by-wire transmission that is placed in various shift ranges, including Park, Drive, and Neutral, and has an automatic Return to Park feature for shifting the transmission to Park when the vehicle is traveling at an extremely low speed or in a stopped condition as a driver prepares to exit the vehicle. The system includes a transmission control, mechanism for determining which of the transmission ranges or modes is desired by the driver. A controller is used to receive information from various sensors, such as a door opening sensor, a seat belt sensor, an ignition switch sensor and the transmission control mechanism to determine when to shift the transmission into the various ranges and modes.

A Neutral Tow mode keeps the transmission from automatically shifting to Park for relatively long periods of time and does not require that the system be powered in order to allow the vehicle to be towed for long distances without draining the battery. The Neutral Tow mode is entered by the controller following a two-stage process wherein first a Neutral Tow option is displayed and then, when the option is selected, the Neutral Tow mode is engaged. The electronic display displays a Neutral Tow option when the transmission control mechanism has been used to select Park, the ignition switch is on, and the engine is off or an information button has been pushed. The display is active only for a limited amount of time after the Neutral Tow mode is entered, a door is opened, or the ignition switch is turned on so that power is not drained from the vehicle. The controller is further configured to enter the Neutral Tow mode upon detecting when the Neutral Tow option has been selected, when the foot brake has been depressed, and when the transmission has been shifted to Neutral. The controller is configured to keep the transmission in Neutral and not automatically shift to Park upon detecting a triggering event and configured to cancel the Neutral Tow mode upon detecting a certain sequence of events. The triggering event is preferably constituted by detecting that an ignition switch has been turned off, the driver has exited the vehicle or a parking brake has been released. The sequence of events includes at least two of the group consisting of: turning on the ignition switch; depressing and holding a brake pedal; and selecting Park.

As can be seen by the above discussion, there is a need in the art for a system that allows a vehicle with a shift-by-wire transmission to be placed in a mode which maintains Neutral without a driver present such as when the vehicle is carried by a conveyor during washing. In addition, there exists a need for a way to keep the transmission in the Neutral gear setting and to further not cause the battery to be drained during towing. It is important that these modes be maintained through the vehicle being powered down, battery disconnect, control module resets, control modules being replaced in service, etc. Typically, the transmission could be in many different mode states. For example, the transmission could be in a Default or Normal mode, or a Neutral Hold, a Neutral Tow mode. When the control module is turned off, the module may not be able to determine what mode the transmission was in before the module was turned off. Therefore, upon restart, the module may put the transmission in the wrong mode, resulting in a false entry or exit into Neutral Hold or Neutral. Tow mode. False entry into Neutral Hold or Neutral Tow from a default mode will result in the vehicle not being commanded to Park when the driver exits the vehicle, thereby resulting in unwanted movement of the vehicle. On the other hand, the false exiting from a Neutral Hold or Neutral Tow to a default mode will result in Park being commanded while the vehicle is being towed, resulting in the vehicle being dragged when it should have stayed in Neutral.

Relying on a single control module to store information regarding which mode the transmission is in can result in failures that cause a mode change because, at least under certain circumstances, the control module could "forget" what mode state the transmission is supposed to be in. For instance, if the control module stores the information in volatile memory, then a battery disconnect could result in loss of memory of the mode state. The control module could store data in non-volatile random access memory to solve problems occurring when the battery is disconnected but the control modules are often set up to write data to non-volatile memory at shut down, so a module reset could also result in loss of memory of the mode state. Even if non-volatile random access memory is written to carefully avoid memory loss, there are module failures that result in non-volatile random access memory errors, all resulting in loss of memory of the mode state. With this in mind, there is seen to exist a need in the art to accurately determine which mode state the transmission is supposed to be in when the transmission controller is turned on after being turned off normally or after a power failure or failure of one of the transmission control modules.

SUMMARY OF THE INVENTION

The present invention is directed to a voting strategy used to determine the mode state of a transmission when a vehicle is restarted. In a preferred embodiment of the invention, a system is provided to recall a mode state in a vehicle having a shift by wire transmission including a return to park feature and a controller including at least three memories. The controller is configured to write a remembered mode state into each memory. The remembered mode state is one of a Normal mode state that allows the transmission to automatically shift to Park, a hold mode state that causes the transmission to remain in Neutral and not automatically shift to Park upon detecting a triggering event or other mode states. The controller reads each memory and, when at least two of the remembered mode states are the same mode state, and causes the transmission to enter a mode state corresponding to the same mode state.

Another aspect of the invention is concerned with a method for determining a mode state. The method includes writing a remembered mode state into each, reading each memory to determine if at least two of the remembered mode states are the same mode state, and causing the transmission to enter a mode state corresponding to the same mode state. Preferably, the method also includes turning off the vehicle and restarting the vehicle, after writing a remembered mode state and before reading each memory. Optionally, the method includes determining if the transmission is in Park before reading each memory and, if the transmission is in Park, causing the transmission to enter Normal mode. Before conducting the voting strategy and before reading each memory, the method determines if the vehicle should be in an Assembly mode by detecting if the transmission is in Drive and that one of the at least three memories is in Park. The controller enters the assembly mode by causing the transmission to enter Park and at least two memories to enter the hold mode state that causes the transmission to stay in Neutral and not automatically shift to Park upon detecting a triggering event. In addition, before reading each memory, the controller determines if a brake is automatically being engaged when the automatic return to park feature is not working and, if so, causes the memories to enter a mode state that stops the brake from automatically being engaged.

Additional objects, features and advantages of the present invention will, become more readily apparent from the following detailed description of preferred embodiments when taken in conjunction with the drawings wherein like reference numerals refer to corresponding parts in the several views.

DETAILED DESCRIPTION OF PREFERRED EMBODIMENTS

Figure 1:
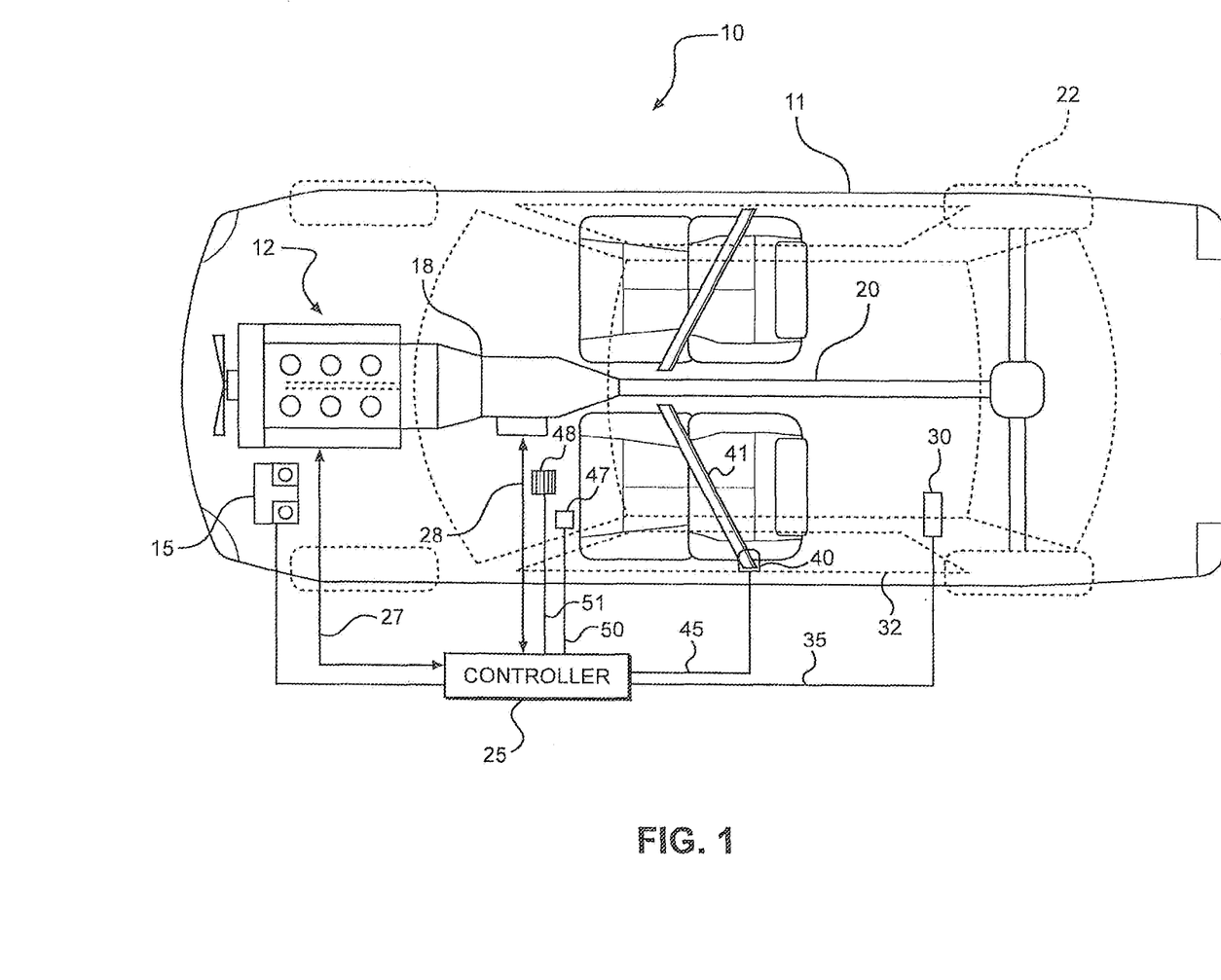
FIG. 1 is a diagram showing a vehicle incorporating a system for providing a voting strategy mode in a shift-by-wire transmission in accordance with the invention.

With initial reference to FIG. 1, there is shown an automotive vehicle 10 having a body 11 and an engine 12 with a battery 15. Power from engine 12 is transmitted to a transmission 18, then to the other portions of a powertrain 20 and eventually to drive wheels 22. Vehicle 10 is shown as a rear wheel drive vehicle but any type of powertrain arrangement, including front wheel or all wheel drive systems, could be employed, in addition, although engine 12 is shown as an internal combustion engine, other types of drive arrangements, including hybrid drive systems, could be utilized. A controller 25 is connected to engine 12 and transmission 18 by communication lines 27 and 28 respectively. Controller 25 uses inputs from several sources to obtain information used to control engine 12 and transmission 18. For example, controller 25 is connected to a driver door sensor 30, for determining if a driver door 32 is open, by communication line 35. A seat belt sensor 40 determines if a seat belt 41 is fastened and is also connected to controller 25 through a communication line 45. An ignition switch 47 and a brake sensor 48 are connected to controller 25 through lines 50 and 51 respectively.

Figure 2:
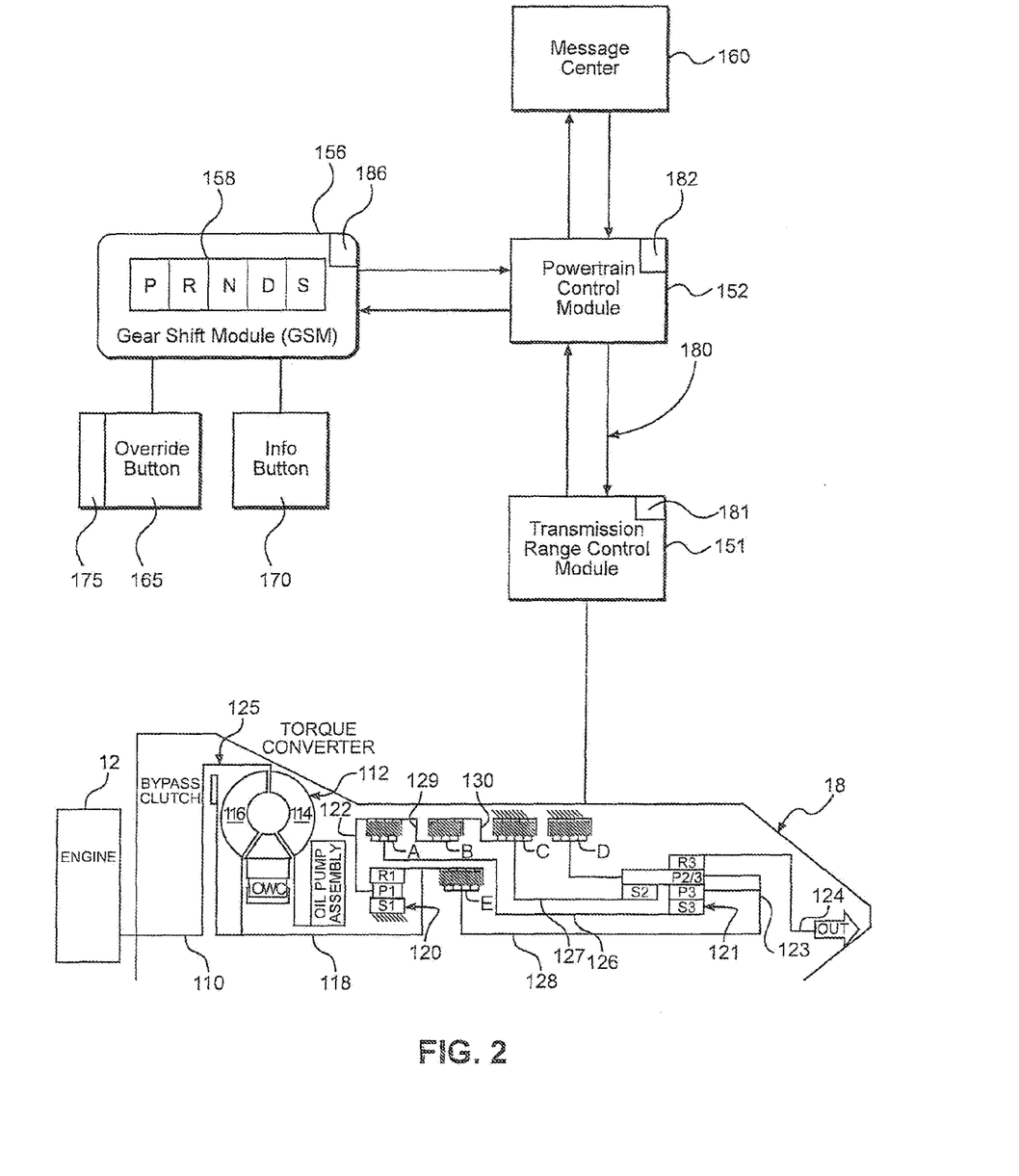
FIG. 2 is a basic schematic diagram of the system shown in FIG. 1.

FIG. 2 shows more details of transmission 18, which is an example of a multiple-ratio transmission wherein ratio changes are controlled by friction elements acting on individual gear elements. While a preferred example is disclosed, numerous different types of transmission could be employed. Engine torque from engine 12 is distributed to torque input element 110 of hydrokinetic torque converter 112. An impeller 114 of torque converter 112 develops turbine torque on a turbine 116 in a known fashion. Turbine torque is distributed to a turbine shaft, which is also transmission input shaft 118. Transmission 18 is shown to include a simple planetary gearset 120 and a compound planetary gearset 121. Gearset 120 has a permanently fixed sun gear S1, a ring gear R1 and planetary pinions P1 rotatably supported on a carrier 122. Transmission input shaft 118 is drivably connected to ring gear R1. Compound planetary gearset 121, sometimes referred to as a Ravagineaux gearset, has a small pitch diameter sun gear S3, a torque output ring gear R3, a large pitch diameter sun gear S2 and compound planetary pinions. The compound planetary pinions include long pinions P2/3, which drivably engage short planetary pinions P3 and torque output ring gear R3. Long planetary pinions P2/3 also drivably engage short planetary pinions P3. Short planetary pinions P3 further engage sun gear S3. Planetary pinions P 2/3, P3 of gearset 21 are rotatably supported on compound carrier 123. Ring gear R3 is drivably connected to a torque output shaft 124, which is drivably connected to vehicle traction wheels 22 through powertrain 20 shown in FIG. 1. Gearset 120 is an underdrive ratio gearset arranged in series with respect to compound gearset 121. Typically, transmission 18 preferably includes a lockup or torque converter bypass clutch, as shown at 125, to directly connect transmission input shaft 118 to engine 12 after a torque converter torque multiplication mode is completed and a hydrokinetic coupling mode begins.

FIG. 2 also shows a Transmission Range Control Module 151, a Powertrain Control Module 152 and a Gear Shift Module 156 that collectively define part of controller 25. Transmission Range Control Module 151 is connected to transmission 18 by a shift cable (not labeled), rather than transmission 18 being connected directly to a driver operated mechanical shifter. A transmission control mechanism, such as Gear Shift Module 156, is provided to select a transmission shift range. One possible implementation would be various buttons 158, each representing a different transmission range. In this type of implementation, Gear Shift Module 156 is used to select several ranges, such as Park where the transmission output is locked to prevent the vehicle from moving, Neutral where the transmission allows vehicle 10 to be moved freely, such as when being towed, Reverse where transmission 18 allows the vehicle to move backwards, and one or more Drive ranges that enable forward motion of the vehicle. Gear Shift Module 156 is also shown to include a Sport range. The Sport range is similar to the Drive range but will cause transmission 18 to shift forward ratios based on inputs from upshift and downshift switches (not shown) actuated by the driver. Gear Shift Module buttons 158 are labeled with letters generally corresponding to the several transmission ranges "P", "R", "N", "D", and "S" as shown in FIG. 2. Once transmission 18 has entered one of the ranges, a message center 160 shows the driver which range was entered. Additionally, Gear Shift Module 156 accepts signals from an override button 165 that enables shifting to a Neutral Hold mode in emergencies, and an info button 170 which causes message center 160 to provide additional information to the driver. Preferably, override button 165 has a cover 175 that protects override button 165 from accidentally being pushed. Each of the control modules 151, 152, and 156 is connected to a local communication network generally indicated at 180 and has a respective non-volatile memory 181, 182, 186.

The Park range can preferably be entered in many ways. In particular, the driver can select Park by pushing the "P" button to cause the Powertrain Control Module 152 to check to see if vehicle 10 is traveling below an extremely low speed (essentially stationary) and, if so, instructs Transmission Range Control Module 151 to shift transmission 18 into Park. Alternatively, when driver ignition switch 47 is turned, to an off position, Powertrain Control Module 152 automatically instructs Transmission Range Control Module 151 to shift transmission 18 into Park, thus enabling a "Return to Park" feature. Similarly, when the driver opens door 32 after unbuckling belt 41, sensors 30 and 40 will signal Powertrain Control Module 152 which automatically instructs Transmission Range Control Module 151 to shift transmission 18 into Park, thus once again enabling a "Return to Park" feature. The Reverse range is entered by pushing the button labeled "R", at which point Powertrain Control Module 152 automatically instructs Transmission Range Control Module 151 to shift transmission 18 into Reverse, thus enabling vehicle 10 to move backward. In the exemplary transmission embodiment shown, the Reverse range is established by applying low-and-reverse brake D and friction element B. The Neutral range is entered by a single push of the "N" button on Gear Shift Module 156 or by a push of the "P" button when vehicle 10 is traveling too fast to safely enter the Park mode. In either case, Powertrain Control Module 152 instructs Transmission Range Control Module 151 to shift transmission 18 into Neutral and transmission 18 allows wheels 22 to rotate freely.

The Drive or Sport ranges are entered by a single push of the "D" or "S" buttons respectively. Optionally, a Low or "L" range (not shown) can be made available to keep transmission 18 in low gears during forward motion of vehicle 10. When in Drive in the exemplary transmission shown, during operation in the first four forward driving ratios, carrier P1 is drivably connected to sun gear S3 through shaft 126 and forward friction element A. During operation in the third ratio, and fifth ratio, direct friction element B drivably connects carrier 22 to shaft 127, which is connected to large pitch diameter sun gear S2. During operation in the fourth, fifth and sixth forward driving ratios, overdrive friction element E connects turbine shaft 118 to compound carrier 123 through shaft 128. Friction element C acts as a reaction brake for sun gear S2 during operation in second and sixth forward driving ratios. During operation of the third forward driving ratio, direct friction element B is applied together with forward friction element A. The elements of gearset 121 then are locked together to effect a direct driving connection between shaft 128 and output shaft 126. The torque output side of forward friction element A is connected through torque transfer element 129 to the torque input side of direct friction element B during forward drive. The torque output side of direct friction element B, during forward drive, is connected to shaft 127 through torque transfer element 130. More details of this exemplary type of transmission arrangement are found in U.S. Pat. No. 7,216,025, which is hereby incorporated by reference.

Preferably, the Neutral Hold mode is entered with sequential Neutral button presses within a calibrated window or by making a valid Neutral button press with driver's door 32 open. When vehicle 10 is in Neutral Hold mode, the "Return to Park" function is deactivated so that vehicle 10 may be propelled by a conveyor or the like, such as at a car washing facility. Generally, the Neutral Tow mode is entered with engine 12 off, ignition switch 47 on and input through a menu driven display. When vehicle 10 is in the Neutral Tow mode, the Return to Park functions are deactivated. Additionally, message center 160 will enter a sleep mode so as to not drain battery 15, which enables vehicle 10 to be towed over long distances. An exemplary description of the Neutral Tow mode is found in concurrently filed U.S. patent application entitled "Method and System for Providing a Neutral Tow Mode in a Shift-by-Wire Transmission" invented by Fyie et al. incorporated herein by reference.

There is provided a flowchart showing a voting strategy 200, described below with respect to FIGS. 3-5, employed in accordance with a preferred embodiment of the invention to determine the mode state of transmission 18 when vehicle 10 is turned on. Voting strategy 200 is preferably executed by controller 25, which includes Powertrain Control Module 152 (PCM), Transmission Range Control Module 151 (TRCM) and Gear Shift Module 156 (GSM). All the control modules 151, 152, and 156 communicate by sending signals through communication network 180 during execution of voting strategy 200. Generally, Powertrain Control Module 152 is given higher priority in controlling transmission 18 when compared to Transmission Range Control Module 151 and Gear Shift Module 156. For example, if transmission 18 is in Neutral Tow mode and Powertrain Control Module 152 is not connected to communication network 180, Gear Shift Module 156 and Transmission Range Control Module 151 will not switch transmission 18 out of Neutral Tow mode. This arrangement eliminates any power-up sequences where only Gear Shift Module 156 and Transmission Range Control Module 151 wake up and cause a false exit of Neutral Tow before Powertrain Control Module 152 is able to prevent the change of mode. Preferably, each of Gear Shift Module 156, Powertrain Control Module 152 and Transmission Range Control Module 151 stores a remembered mode state (Normal, Neutral Hold, Neutral Tow, etc.) of transmission 18 in non-volatile memory 181, 182, 186. The remembered mode state of each module 151, 152, 156 is considered a "vote" and therefore "remembered mode state" and "vote" are used interchangeably. This terminology is intended to be distinguished from "a mode state", which refers to an actual present mode state of transmission 18. Gear Shift Module 156 and Transmission Range Control Module 152 send signals carrying remembered mode states regarding their memory 186, 182 about the mode state of transmission 18 to Powertrain Control Module 152 via communication network 180. Preferably, upon module initialization, Powertrain Control Module 152 will wait until both Gear Shift Module 156 and Transmission Range Control Module 151 are communicating on communication network 180 and report their remembered mode states, and then Powertrain Control Module 152 will compare its own remembered mode state of transmission 18 with the remembered mode state read from signals generated by the other two modules. A basic voting strategy is that, if two of the three modules report the same remembered mode state then Powertrain Control Module 152 changes transmission 18 to that same mode state.

Preferably, there are some exceptions to the voting strategy. For example, if transmission 18 is verified to be in Park when the voting strategy is executed then transmission 18 will be considered to be in Normal mode. Controller 25 will not exit Park without a driver shift request entered into Gear Shift Module 156. Normally, the "votes" are combined at start-up and then voting strategy 200 is disabled until the next power-up. However, if the Powertrain Control Module 152 receives information that indicates the shift cable is being connected between transmission 18 and Transmission Range Control Module 151, voting strategy 200 will cause transmission 18 to be in an Assembly mode. During Assembly mode, Transmission Range Control Module 152 will shift transmission 18 to Drive and hold this position to allow the shift cable to be connected. When this occurs, Gear Shift Module 156 and Transmission Range Control Module 151 will also stay in Drive and, if Powertrain Control Module 152 sees both modules report Neutral Hold mode, Powertrain Control Module 152 will rerun voting strategy 200, have transmission 18 enter Neutral Hold mode, and insure that control modules 151, 152, and 156 do not interfere with the attachment procedure. Upon completion of the assembly process, a technician will select Park, which will place transmission 18 back in the Normal mode.

Voting strategy 200 will now be discussed in more detail with respect to FIGS. 3-5. The preferred method starts at step 205 and is implemented by controller 25. At step 208, controller 25 determines if voting strategy has been executed before, i.e., since the last time controller 25 was started, and thus controller 25 can be considered to be in an initial state. If controller 25 is in the initial state, the method proceeds to step 210 wherein Powertrain Control Module 152 checks to see if the "votes" (Normal, Neutral Hold, Neutral Tow, etc.) have been received from Gear Shift Module 156 and Transmission Range Control Module 151. If the "votes" have not been received, controller 25 returns to start 205.

If the "votes" have been received, controller 25 then reads a signal from transmission 18 at step 210 to verify if transmission 18 is in Park at step 215. If transmission 18 is in Park then, at step 217, controller 25 also checks to see if any of Transmission Range Control Module 151, Powertrain Control Module 152, and Gear Shift Module 156 remembers the mode status to be in Normal mode and, if so, controller 25 sends a signal to cause transmission 18 to enter or stay in Normal mode and enters no change of state at 220 and returns to start at 221. At step 217, if any of Transmission Range Control Module 151, Powertrain Control Module 152, and Gear Shift Module 156 is not in the Normal mode, then controller 25 commands modules 151, 152 and 156 to enter the Normal mode at 222 until all of the modules enter Normal mode as shown at step 224. When all of Transmission Range Control Module 151, Powertrain Control Module 152, and Gear Shift Module 156 remember the mode status to be in Normal mode at step 224, then controller 25 sends a signal to transmission 18 to enter or stay in Normal mode and enters no state change at 220 and returns to start at 221.

If at step 215, transmission 18 is not in Park, then controller 25 checks, at step 230, to determine if all three modules 151, 152, and 156 agree on the remembered mode state of transmission 18 at step 230. If modules 151, 152, and 156 indicate the same mode state, controller 25 sends a signal causing transmission 18 to enter the same mode state and proceeds to step 220 described above, if modules 151, 152, and 156 do not agree controller 25 proceeds to step 235 and checks to determine if two of three modules indicate Normal mode. If two modules indicate Normal mode, controller 25 proceeds to step 222 described above, if not controller 25 proceeds to step 240.

At step 240, controller 25 determines if any two of Transmission Range Control Module 151, Powertrain Control Module 152, and Gear Shift Module 156 indicate the remembered mode status to be Neutral Hold mode. If they do then controller 25 commands the modules to enter Neutral Hold mode at step 242 until aft of the modules enter Neutral Hold at step 244 and then controller 25 sends a signal to cause transmission 18 to enter Neutral Hold and proceeds to step 220 described above. If any two of control modules 151, 152, and 156 do not indicate the remembered mode status to be Neutral Hold mode at step 240 then controller 25 proceeds to step 245.

At step 245, controller 25 determines if any two of Transmission Range Control Module 151, Powertrain Control Module 152, and. Gear Shift Module 156 indicate the remembered mode status to be Neutral Tow mode. If they do then controller 25 commands the modules to enter Neutral Tow mode at step 247 until all of the modules enter Neutral Tow at step 249 and then controller 25 proceeds sends a signal to cause transmission 18 to enter Neutral Tow and to step 220 described above. If any two of control modules 151, 152, and 156 do not indicate the remembered mode status to be Neutral Hold mode at step 245, then controller 25 proceeds to step 250 shown in FIG. 3 and again in FIG. 4.

Figure 4:
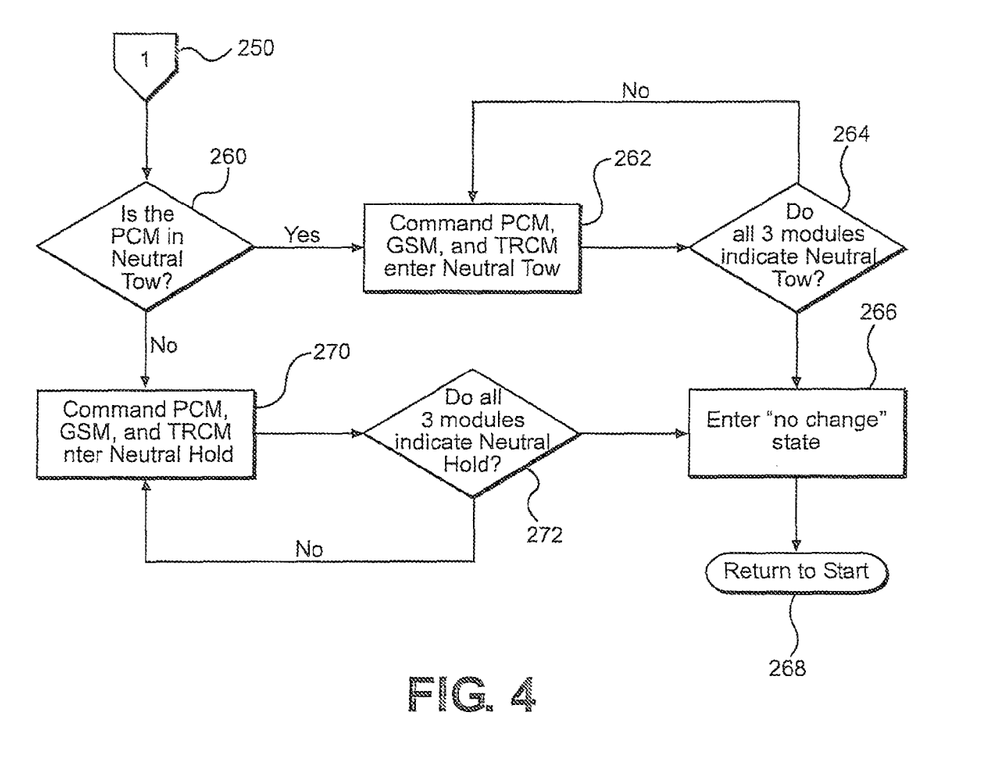
FIG. 4 is a flowchart showing another part of the control routine employed in the system of FIG. 1.

Turning to FIG. 4, at step 260, controller 25 determines if Powertrain Control Module 152 is reporting Neutral Tow mode. If so, controller 25 proceeds to step 262 where controller 25 commands modules 151, 152 and 156 to enter Neutral Tow mode until all of the modules enter Neutral Tow at step 264. Then controller 25 enters no change of state at 266 and returns to start at 268. If Powertrain Control Module 152 is not reporting Neutral Tow mode at step 260, controller 25 proceeds to step 270 where controller 25 commands the modules to enter Neutral Hold mode until all of the modules enter Neutral Hold at step 272, then controller 25 proceeds to step 266. Of course at step 260, controller 25 could also proceed to step 247 if Powertrain Control Module 152 is reporting Neutral Tow mode, and step 242 if Powertrain Control Module 152 is not reporting Neutral Tow.

Figure 3:
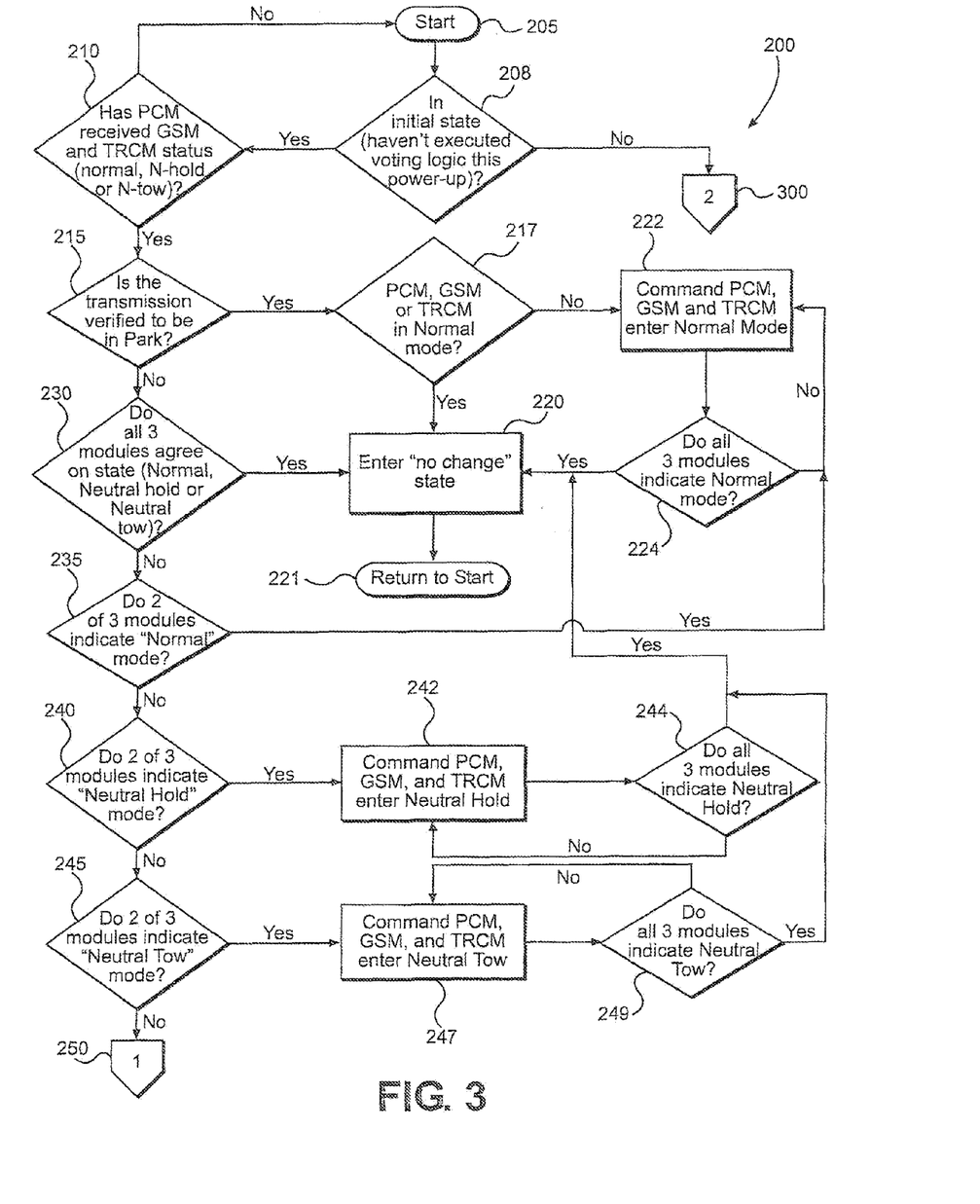
FIG. 3 is a flowchart showing part of a control routine employed in the system of FIG. 1 used to execute the voting strategy according to a preferred embodiment of the invention.
Figure 5:
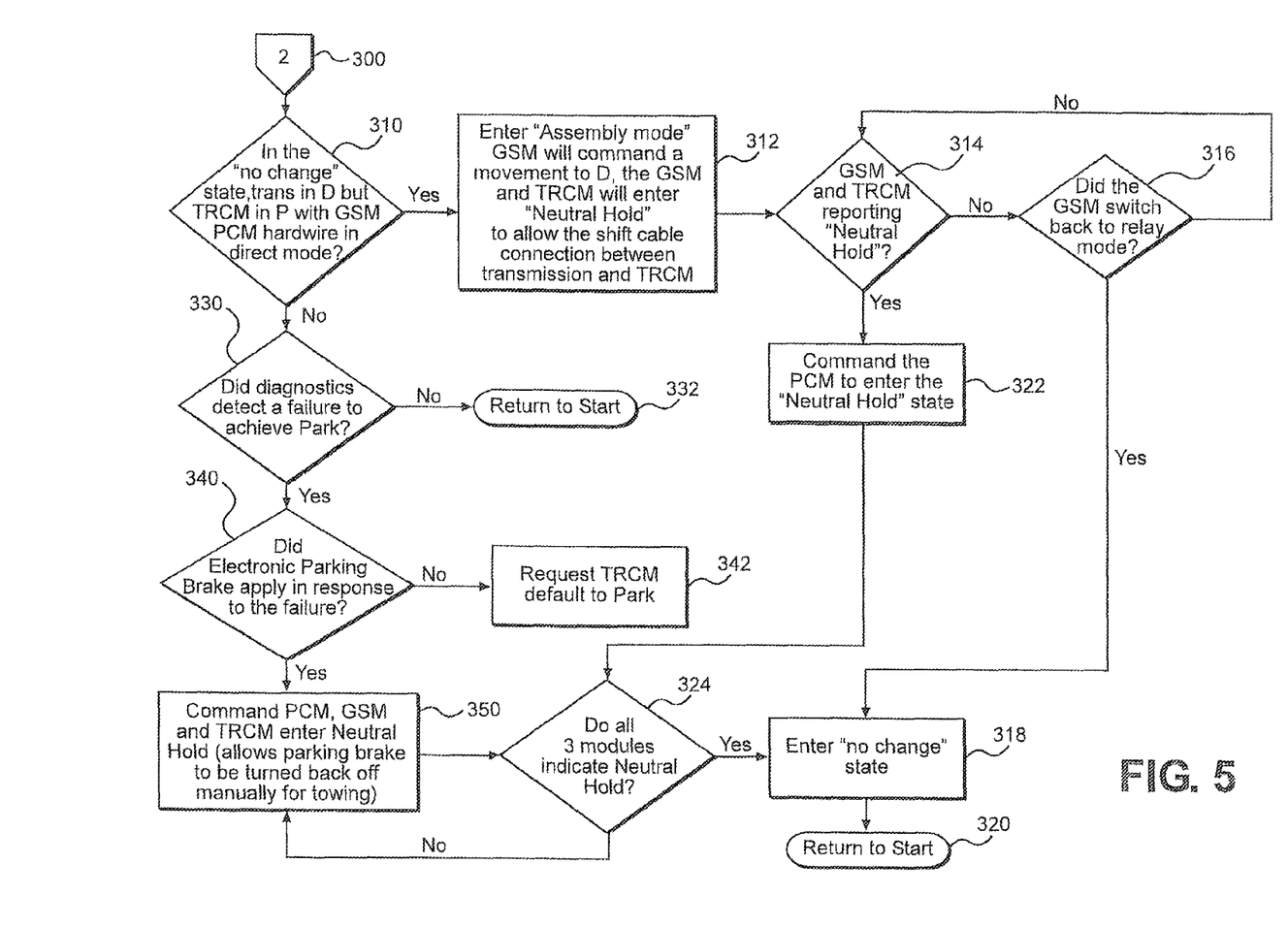
FIG. 5 is a flowchart showing yet another part of the control routine employed in the system of FIG. 1.

Turning now to FIGS. 3 and 5 and step 208, if controller 25 is not in the initial state the method proceeds to step 300, leading to steps where diagnostic and assembly modes are described. Next, at step 310 controller 25 determines if transmission 18 is in Drive, reads a signal from Transmission Range Control Module 151 to determine if the Transmission Range Control Module 151 is in Park, and determines Gear Shift Module 156 in direct mode whereby Gear Shift Module 156 is bypassing Powertrain Control Module 152 and communicating directly with Transmission Range Control Module 151 either through communication network 180 or a separate communication line (not shown), in which case controller 25 enters the assembly mode at step 312. In assembly mode, Gear Shift Module 156 commands Drive while Transmission Range Control Module 151 moves to Drive and both the Gear Shift Module 156 and Transmission Range Control Module 151 enters Neutral Hold mode to allow the shift cable to be connected between transmission 18 and Transmission Range Control Module 151. Controller 25 then proceeds to step 314 and determines if Gear Shift Module 156 and Transmission Range Control Module 151 are reporting Neutral Hold Mode.

If at step 314, Gear Shift Module 156 and Transmission Range Control Module 151 are not reporting Neutral Hold Mode then controller 25 proceeds to step 316. At step 316, controller 25 determines if Gear Shift Module 156 switched to relay mode whereby commands are sent to Powertrain Control Module 152 and relayed to Transmission Range Control Module 151 and, if not, controller 25 proceeds back to step 314, otherwise controller 25 does not change state at step 318 and returns to start at step 320. If, at step 314, Gear Shift Module 156 and Transmission Range Control Module 151 are reporting Neutral Hold Mode then controller 25 proceeds to step 322 and commands Powertrain Control Module 152 to enter Neutral Hold. If all three modules 151, 152 and 156 indicate Neutral Hold at step 324 then controller 25 causes transmission 18 to enter Neutral Hold and proceeds to step 318 described above.

At step 310, if controller 25 does not enter the assembly mode, controller 25 proceeds to step 330 and checks diagnostics to determine if there is a failure to achieve Park. If there is no failure, controller 25 returns to start at 332. If there is a failure, controller 25 checks through sensor 48 at step 340 to determine if an electronic parking brake was properly applied in response to the failure. If the brake was not applied, then controller 25 requests Transmission Range Control Module 151 to default to Park at step 342, otherwise controller 25 proceeds to step 350. At step 350, controller 25 commands Transmission Range Control Module 151, Powertrain Control Module 152 and Gear Shift Module 156 to enter Neutral Hold and continues to do so at step 324 until all three modules indicate Neutral Hold. Controller 25 then proceeds to step 318 as described above.

Figure 6A:
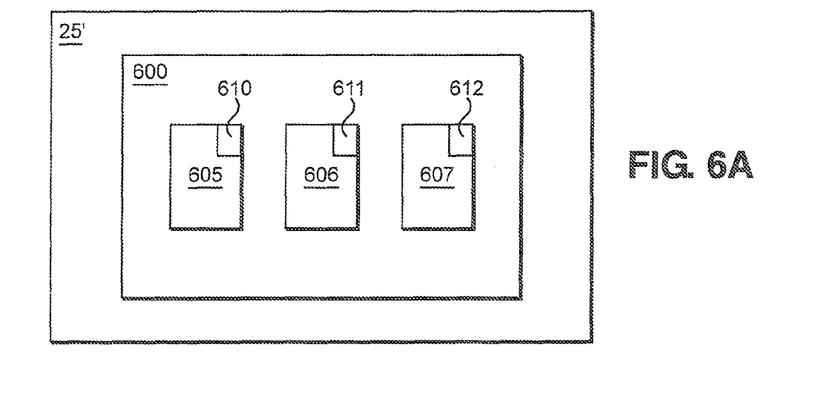
FIG. 6A is a schematic diagram of a controller in accordance with one embodiment of the invention.
Figure 6B:
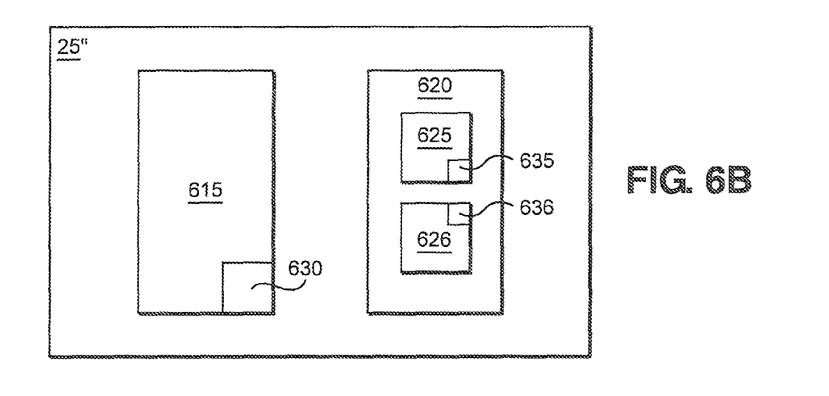
FIG. 6B is a schematic diagram of a controller in accordance with a further embodiment of the invention.

The various embodiments above generally refer to three control modules, namely Transmission Range Control Module 151, Powertrain Control Module 152 and Gear Shift Module 156 that collectively define part of controller 25. However, in other preferred embodiments, controller 25 includes fewer than three control modules, and at least one of the control modules has more than one core. This allows controller 25 to accomplish the same result as above, but with a different configuration. For example, in one embodiment shown in FIG. 6A, a controller 25' includes a single control module 600 with three cores 605, 606 and 607. Control module 600 is able to store one remembered mode state (Normal, Neutral Hold, Neutral Tow, etc.) of transmission 18 in each non-volatile memory 610, 611, 612 of the three cores 605, 606 and 607. In another embodiment shown in FIG. 6B, a controller 25" includes a first control module 615 and a second control module 620, control module 620 having two cores 625 and 626. As above, control module 615 is able to store one remembered mode state in a non-volatile memory 630 while control module 620 is able to store one remembered mode state in each non-volatile memory 635, 636 of the two cores 620 and 621. As a result, in either embodiment, controller 25' or 25" has access to three remembered mode states or "votes" even though there are fewer than three control modules.

Figure 6C:
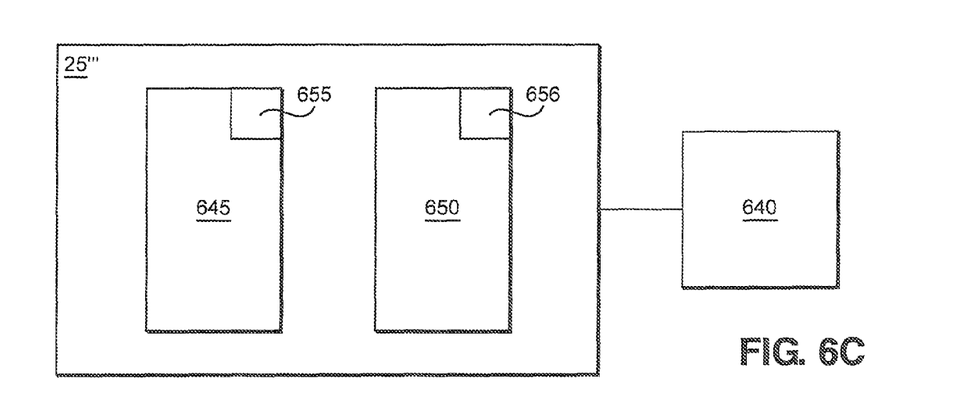
FIG. 6C is a schematic diagram of a controller and sensor in accordance with a still further embodiment of the invention.

In a related embodiment shown in FIG. 6C, vehicle 10 includes an additional sensor 640 and a controller 25''' is provided with a first control module 645 and a second control module 650. In one embodiment, sensor 640 is located in transmission 18 in order to provide additional information about the state or operation of transmission 18. However, in other embodiments, sensor 640 is located in another portion of vehicle 10, such as in a gear shift module, and provides controller 25''' with information appropriate to that location. As above, each of first control module 645 and second control module 650 is able to store one remembered mode state of transmission 18 in each non-volatile memory 655, 656. When the remembered mode state of each control module 645, 650 matches, then sensor 640 is used to confirm the plausibility of that state using the information about the state or operation of transmission 18. If the remembered mode state is deemed plausible, controller 25''' directs transmission 18 to enter that mode state. If the remembered mode state is deemed implausible, controller 25''' directs transmission 18 to enter a safe state, such as Park or Neutral for example. Similarly, if the remembered mode state of control module 645 does not match the remembered mode state of control module 650, then controller 25''' directs transmission 18 to enter a safe state.

Based on the above, it should be readily apparent that the present invention provides for a voting strategy allowing a transmission controller to determine upon restart of the vehicle what the mode state of the transmission was before the vehicle was powered down and thus enables the transmission to be placed in a proper mode state. Advantageously, since the transmission stays in the proper mode state, the transmission will not improperly engage or disengage park. Although described with reference to preferred embodiments of the invention, it should be readily understood that various changes and/or modifications could be made to the invention without departing from the spirit thereof. For instance, numerous minor variations to the preferred number of control modules could be made without changing the inventive concept. In addition, although push buttons are employed in disclosed embodiments, various other selecting arrangements, including numerous switches, could be employed. In general, the invention is only intended to be limited by the scope of the following claims.

The invention claimed is:

1. A method for determining a mode state in a shift-by-wire transmission in a vehicle including at least three memories, said method comprising:
   writing a remembered mode state into each memory;
   reading each memory; and
   if at least two of the remembered mode states match then causing the transmission to enter a mode state corresponding to the at least two remembered mode states which match.

2. The method of claim 1, wherein the vehicle further includes a first transmission control module and a second transmission control module, the first transmission control module having at least one of the at least three memories and the second transmission control module having at least two of the at least three memories, said method further comprising:
   writing the remembered mode state into the at least one memory of the first transmission control module;
   writing the remembered mode state into each of the at east two memories of the second transmission control module;
   reading the at least one memory of the first transmission control module;
   reading each of the at least two memories of the second transmission control module; and
   if at least two of the remembered mode states match, causing the transmission to enter a mode state corresponding to the at least two remembered mode states that match.

3. The method of claim 1, further comprising:
   writing the remembered mode state before the vehicle is turned off and reading each memory after the vehicle is restarted, wherein the remembered node state is one of a normal mode state that allows the transmission to automatically shift to Park, a hold mode state that causes the transmission to stay in Neutral and not automatically shift to Park upon detecting a triggering event or other mode states.

4. The method of claim 3, further comprising:
   determining if the transmission is in Park before reading each memory and, if the transmission is in Park then causing the transmission to enter the normal mode.

5. The method of claim 3, further comprising:
   causing the at least three memories to enter the same mode state.

6. The method of claim 3, wherein the vehicle further includes a powertrain control module having at least one of the at least three memories and said method further comprises:
   if, upon reading each memory, at least two of the remembered mode states are not the same, then causing the transmission to enter a mode state corresponding to the remembered mode state of the powertrain control module.

7. The method of claim 3, further comprising:
   before reading each memory, determining if the vehicle should be in an assembly mode wherein the transmission is being attached to the vehicle and, if so, entering the assembly mode.

8. The method of claim 7, wherein determining if the vehicle should be in an assembly mode includes detecting if the transmission is in Drive and one of the remembered mode states of the at least three memories is Park.

9. The method of claim 7, wherein entering the assembly mode includes causing the transmission to enter Drive and at least two of the at least three memories to enter the hold mode state that causes the transmission to stay in Neutral and not automatically shift to Park upon detecting a triggering event.

10. The method of claim 3, wherein the vehicle further includes at least one transmission control module, said method further comprising:
 before reading each memory, determining if a brake is automatically being engaged when an automatic return to park feature of the normal mode is not working and, if so, causing the at least one transmission control module to enter a mode state that causes the transmission to stay in Neutral and not automatically shift to Park upon detecting the triggering event and also stopping the brake from automatically being engaged.

11. The method of claim 1, wherein:
 writing the remembered mode state into each memory includes sending a signal carrying the remembered mode state to each memory; and
 reading each memory includes reading a signal sent from each memory.

12. A method for determining a mode state in a shift-by-wire transmission in a vehicle including a sensor and at least two memories, said method comprising:
 writing a remembered mode state into each memory;
 reading each memory;
 if at least two of the remembered mode states match, then determining, with the sensor, a plausibility of a mode state corresponding to the at least two remembered mode states which match;
 if the mode state corresponding to the at least two remembered mode states which match is determined to be plausible, causing the transmission to enter the mode state corresponding to the at least two remembered mode states which matched; and
 if at least two of the remembered mode states do not match, then causing the transmission to enter a safe mode state.

13. The method of claim 12, further comprising:
 writing the remembered mode state before the vehicle is turned off and reading each memory after the vehicle is restarted, wherein the remembered mode state is one of a normal mode state that allows the transmission to automatically shift to Park, a hold mode state that causes the transmission to stay in Neutral and not automatically shift to Park upon detecting a triggering event or other mode states.

14. The method of claim 13, further comprising:
 determining if the transmission is in Park before reading each memory and if the transmission is in Park then causing the transmission to enter normal mode.

15. The method of claim 13, wherein the vehicle further includes a powertrain control module having at least one of the at least two memories and said method further comprises:
 if, upon reading each memory, at least two of the remembered mode states are not the same then sending a signal to cause the transmission to enter a mode state corresponding to the remembered mode state of the powertrain control module.

16. The method of claim 13, further comprising:
 before reading each memory, determining if the vehicle should be in an assembly mode wherein the transmission is being attached to the vehicle and, if so, entering the assembly mode.

17. The method of claim 16, wherein determining if the vehicle should be in an assembly mode includes detecting if the transmission is in Drive and one of the remembered mode states of the at least two memories is Park.

18. The method of claim 16, wherein entering the assembly mode includes causing the transmission to enter Drive and at least two of the at least two memories to enter the hold mode state that causes the transmission to stay in Neutral and not automatically shift to Park upon detecting a triggering event.

19. A system for remembering a mode state in a vehicle comprising:
 a shift-by-wire transmission including a return to park feature; and
 a controller including at least three memories, the controller configured to: write a remembered mode state into each memory, the remembered mode state being one of a normal mode state that allows the transmission to automatically shift to Park, a hold mode state that causes the transmission to stay in Neutral and not automatically shift to Park upon detecting a triggering event or other mode states; read each memory to determine if at least two of the remembered mode states match; and cause the transmission to enter a hold mode state corresponding to the at least two remembered mode states that match.

20. The system of claim 19, wherein the controller further includes a gear shift control module adapted to receive commands from a driver, a transmission range control module adapted to shift the transmission into different ranges and a powertrain control module adapted to supervise the gear shift control module and the transmission range control module.

21. The system of claim 19, wherein the controller further includes at least two transmission control modules, further comprising: a shift cable, wherein the controller is configured to cause the transmission to enter an assembly mode to allow the shift cable to be connected between the transmission and one of the at least two transmission control modules.

22. The system of claim 19, further comprising: an automatic brake engagement system for engaging a brake when the return to park feature does not work and wherein the controller is configured to cause the transmission to enter a mode that disables the automatic engagement system.

23. A system for remembering a mode state in a vehicle including a sensor comprising:
 a shift-by-wire transmission including a return to park feature; and
 a controller including at least two memories, the controller configured to: write a remembered mode state into each memory, the remembered mode state being one of a normal mode state that allows the transmission to automatically shift to Park, a hold mode state that causes the transmission to stay in Neutral and not automatically shift to Park upon detecting a triggering event or other mode states; read each memory to determine if at least two of the remembered mode states match; if at least two of the remembered mode states match, determine, with the sensor, a plausibility of a mode state corresponding to the at least two remembered mode states that match; if the mode state corresponding to the at least two remembered mode states which match is determined to be plausible, causing the transmission to enter the mode state corresponding to the at least two remembered mode states which match; and, if at least two of the remembered mode states do not match, then causing the transmission to enter a safe mode state.

24. The system of claim 23, wherein the controller further includes a gear shift control module adapted to receive commands from a driver, a transmission range control module adapted to shift the transmission into different ranges and a powertrain control module adapted to supervise the gear shift control module and the transmission range control module.

25. The system of claim 23, wherein the controller further includes at least two transmission control modules, further comprising: a shift cable, wherein the controller is configured to cause the transmission to enter an assembly mode to allow the shift cable to be connected between the transmission and one of the at least two transmission control modules.

26. The system of claim 23, further comprising: an automatic brake engagement system for engaging a brake when the return to park feature does not work and wherein the controller is configured to cause the transmission to enter a mode that disables the automatic engagement system.

* * * * *